United States Patent
Kircher

(10) Patent No.: US 6,920,462 B2
(45) Date of Patent: Jul. 19, 2005

(54) METHOD AND DEVICE FOR PERFORMING A QUERY ON A MARKUP DOCUMENT TO CONSERVE MEMORY AND TIME

(75) Inventor: Michael Kircher, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 264 days.

(21) Appl. No.: 09/988,162

(22) Filed: Nov. 19, 2001

(65) Prior Publication Data

US 2002/0062311 A1 May 23, 2002

(30) Foreign Application Priority Data

Nov. 17, 2000 (EP) .......................................... 00125159

(51) Int. Cl.⁷ .............................................. G06F 17/30
(52) U.S. Cl. ..................... 707/104.1; 709/223; 709/310
(58) Field of Search .............................. 707/104.1, 517; 709/223, 310; 715/513, 517

(56) References Cited

U.S. PATENT DOCUMENTS

| | | | |
|---|---|---|---|
| 6,125,391 A | * | 9/2000 | Meltzer et al. ............. 709/223 |
| 6,366,926 B1 | * | 4/2002 | Pohlmann et al. ........ 707/104.1 |
| 6,507,856 B1 | * | 1/2003 | Chen et al. .................. 715/513 |
| 6,558,431 B1 | * | 5/2003 | Lynch et al. ................. 715/513 |
| 2001/0018697 A1 | * | 8/2001 | Kunitake et al. ............ 707/517 |
| 2002/0124115 A1 | * | 9/2002 | McLean et al. .............. 709/310 |

* cited by examiner

Primary Examiner—Charles Rones
(74) Attorney, Agent, or Firm—Staas & Halsey LLP

(57) ABSTRACT

A method of performing a query on a Markup document, which includes steps of receiving a query and designing a plurality of filters to reflect a structural linkage of a condition tree representing the query. The step of designing the plurality of filters includes designing a highest-level filter that can become active only if an event-based parser indicates that an element for which the highest-level filter is searching has been found. The step of designing the plurality of filters also includes designing a lowest-level filter that can become active only when the highest-level filter has become active and when the parser indicates that an element for which the lowest-level filter is searching has been parsed. The method also includes a step of parsing a Markup document, and a step of checking the lowest-level filter to determine whether it has found the element for which it has been searching.

7 Claims, 3 Drawing Sheets

This is an example of an XML (software package) descriptor used to describe CORBA components.

FIG 1

File package.csd:
```xml
<softpkg name="Bank" version="1.0.1.0">
 <pkgtype>CORBA Component </pkgtype>
         <title>Bank</title>
         <author>
           <company>Acme Component Corp.</company>
           <webpage href="http://www.acmecomponent.com"/>
         </author>
         <description>Yet another bank example</description>
<license href="http://www.acmecomponent.com/license.html"/>
<idl id="IDL:M1/Bank:1.0">
  <link href="ftp://xty/Bank.idl"/>
</idl>
</propertyfile>
  <fileinarchive name="bankprops.cpf"/>
<propertyfile>
<implementation id="DCE:700dc518-0110-11ce-ac81-0800090b5d3e">
      <os name="WinNT" version="4.0.0.0"/>
      <os name="Win95"/>
      <processor name="x86"/>
      <compiler name="MSVC"/>
      <programminglanguage name="C++"/>
      <dependency type="ORB"> <name>TAO</name> </dependency>
      <descriptor type="CORBA Component">
        <fileinarchive >processcontainer.ccd</fileinarchive>
      </descriptor>
      <code type="DLL">
        <fileinarchive name="TestComponent.dll"/>
        <entrypoint>createBankHome</entrypoint>
      </code>
      <dependency type="DLL">
        <localfile name="açed.dll"/>
      </dependency>
</implementation>
<implementation id="DCE:297f3e18-0110-11ce-acBf-08074982ad3e"
   variation="RemoteHome">
      <os name="Solaris" version="5.5.0.0"/>
      <processor name="sparc"/>
</implementation>
</softpkg>
```

METHOD AND DEVICE FOR PERFORMING A QUERY ON A MARKUP DOCUMENT TO CONSERVE MEMORY AND TIME

CROSS REFERENCE TO RELATED APPLICATIONS

This application is based on and hereby claims priority to European Application No. 00125159.4 filed on Nov. 17, 2000 in Europe, the contents of which are hereby incorporated by reference.

BACKGROUND OF THE INVENTION

The invention relates to a method for performing a query on a document created using a Markup language and to software and hardware configured to carry out the method. More specifically, the invention enables the time required to perform a query to be reduced and enables the size of the memory required to perform the query to be reduced as compared to the related art.

There are two basic ways to interface a parser with an application, namely, using an object-based interface and an event-based interface. A Markup language that is becoming popular at the time of writing this application is XML (Extensible Markup Language), and two types of interfaces have been developed for use with XML. The DOM (Document Object Model) interface is an object-based interface and the SAX (Simple Application Programming Interface) is an event-based interface. Related art methods of searching a Markup document using either of these interfaces involve constructing a tree representing the document to be searched.

With a parser using an object-based interface, such as the DOM, the parser explicitly builds a tree of objects that contains all of the elements of the XML document. In contrast, a SAX parser usually accepts a document handler that receives callbacks invoked by the SAX parser. The callbacks inform the document handler of events that are read by the SAX parser. Such events can be, for example, a start-tag and an end-tag. The sequence of callbacks allows the document handler to build a tree of objects of all of the XML elements as they appear in the XML document. However, constructing such a tree requires a great deal of memory and time, and a query, typically, runs several times over the constructed tree.

SUMMARY OF THE INVENTION

It is accordingly an object of the invention to provide a method and a device which overcomes the hereinafore-mentioned disadvantages of the heretofore-known methods and devices of this general type in such a way that the time required to perform a query of a markup document (a document containing data and markup) can be reduced and the size of the memory required to perform the query can be reduced.

With the foregoing and other objects in view there is provided, in accordance with one aspect of the invention a method of performing a query on a Markup document, which includes steps of receiving a query and designing a plurality of filters to reflect a structural linkage of a condition tree representing the query. The step of designing the plurality of filters includes designing a highest-level filter that can become active only if an event-based parser indicates that an element for which the highest-level filter is searching has been found. The step of designing the plurality of filters also includes designing a lowest-level filter that can become active only when the highest-level filter has become active and when the parser indicates that an element for which the lowest-level filter is searching has been parsed. The method also includes a step of parsing a Markup document, and a step of checking the lowest-level filter to determine whether it has found the element for which it has been searching.

A query is expressed as a condition tree, which has at every single condition a linkage to a filter, as described above. A single condition determines its result by evaluating its linked filter. A composite condition determines its value by evaluating all of its sub-conditions.

In accordance with an added feature of the invention, the step of designing the plurality of filters includes: designing at least one intermediate-level filter that can become active only when the highest-level filter has become active and when the parser indicates that an element for which the intermediate-level filter is searching has been parsed; and designing the lowest-level filter to become active only when the intermediate-level filter has become active.

In accordance with an additional feature of the invention, the lowest-level filter is defined as a first lowest-level filter; and the method includes steps of designing a second lowest-level filter that can become active only when the highest-level filter has become active and when the parser indicates that an element for which the lowest-level filter is searching has been parsed; and checking the second lowest-level filter to determine whether it has found the element for which it has been searching.

In accordance with another feature of the invention, the value filter is designed to become active only when the highest-level filter has become active and when the parser indicates that an element for which the value filter is searching has been parsed. If the first lowest-level filter has found the element for which it has been searching and the second lowest-level filter has found the element for which it has been searching, an element is obtained from the value filter that is linked to the elements in the first lowest-level filter and in the second lowest-level filter.

In accordance with a further feature of the invention, the method includes designing a value filter that will become active only when the highest-level filter has become active and when the parser indicates that an element for which the value filter is searching has been parsed; and if the lowest-level filter has found the element for which it has been searching, obtaining an element from the value filter that is linked to the element in the lowest-level filter.

In accordance with a further added feature of the invention, computer executable instructions for performing the method are stored on a computer-readable medium.

In accordance with a concomitant feature of the invention, a computer device is programmed to perform the method by executing the instructions that have been stored on a computer readable medium.

One aspect of the invention enables desired information to be read from a Markup document in an extremely efficient manner and involves using an event-based interface to read the document such that a tree need not be constructed representing the Markup document.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows an XML document named package.csd;

DESCRIPTION OF THE PREFERRED EMBODIMENTS

Figure 2:
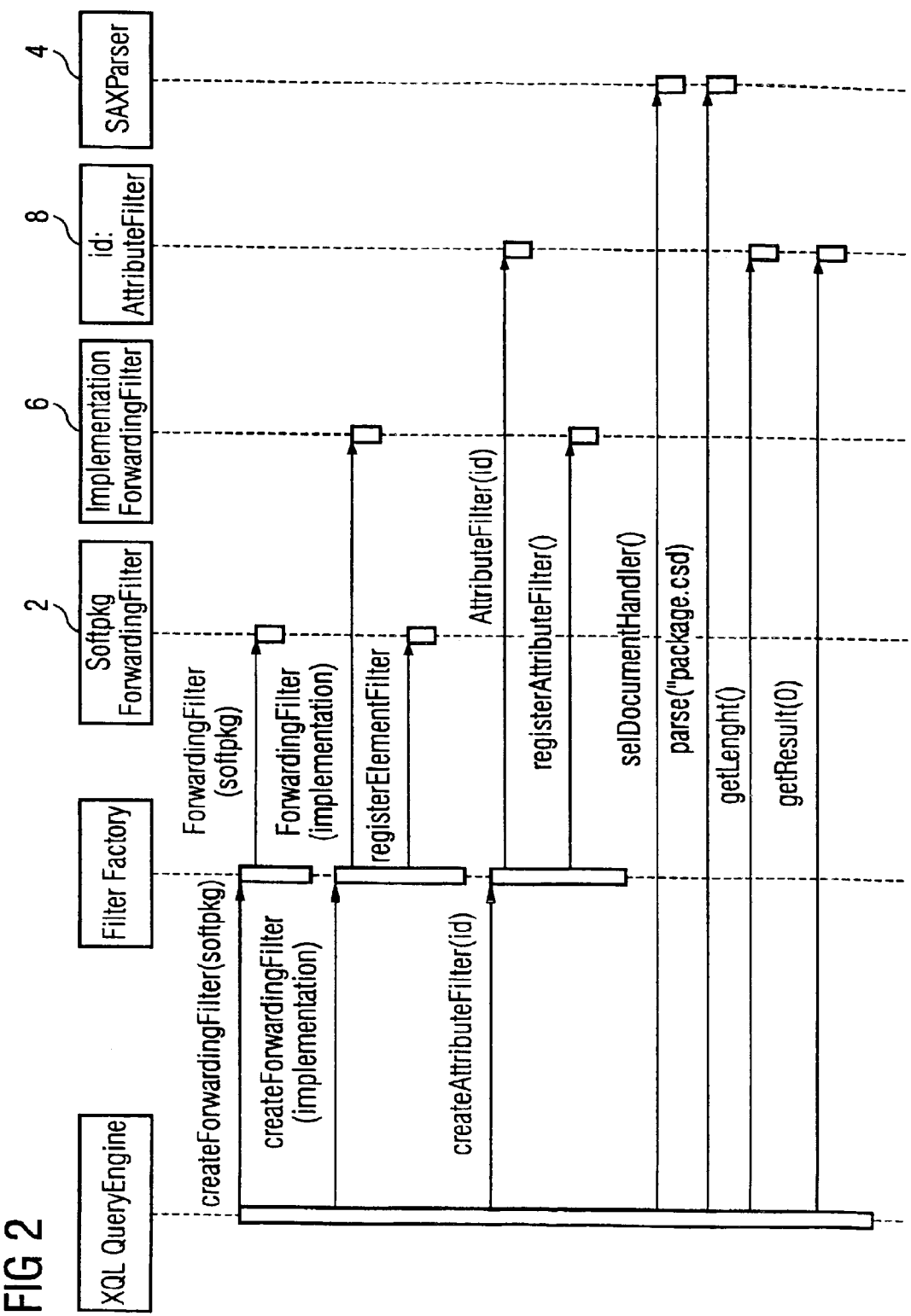
FIG. 2 shows the interaction of methods necessary to perform the simple XQL query"softpkgimplementation/@id" on the XML document.

Reference will now be made in detail to the preferred embodiments of the present invention, examples of which are illustrated in the accompanying drawings, wherein like reference numerals refer to like elements throughout.

One aspect of the invention involves using an event-based interface to read a Markup document. An exemplary embodiment of the invention will be described that uses a SAX interface to read an XML document. However, it should be apparent that the invention could be constructed using another event-based interface constructed for use with another Markup language, and therefore, the invention should not be construed as being limited to use with XML documents.

One aspect of the invention is based upon the concept of constructing a condition tree representing the query to be performed on the document and constructing filters in accordance with the tree, instead of constructing a tree of document elements beforehand. The filters are document handlers that are hierarchically registered with each other and at the topmost level with a parser. The filter cascade begins with the construction of forwarding filters to narrow the elements to read from. A query filter is created which also serves as a forwarding filter. During the creation of the query filter, the condition expression, as part of the query, is read and a condition cascade is initialized. The condition cascade uses the composite design pattern to represent the conditions and their Boolean links. After construction of the query filter, a filter chain for a value filter is created. At the bottom level, this is mostly, an "existence", "elementlist", or "attribute" filter which serves as a value filter. If a query filter was created due to the presence of a condition in the query, this value filter is linked to the condition. If the query did not contain a condition, the value filter serves as the filter from which the results are directly obtained. The topmost filter is registered with the parser, for example, an XML parser supporting the SAX interface. The topmost filter then delegates to all of the lower level filters, including the "query", "existence", "elementlist", "forwarding" and/or "attribute" filters. The query filter evaluates the condition at certain check points which are at the end of its designated scope. In the example provided below, the evaluation would be at the end of the element "implementation". If there are composite conditions, they would evaluate their subconditions based upon the Boolean expressions that link them together. Finally, if the condition is evaluated to be true, the associated value filter is read.

FIG. 1 shows an example of an XML document or descriptor named package.csd that is used to describe CORBA components. FIG. 2 shows the interaction of methods or operations necessary to perform a simple query of the XML document. The XQL (XML Query Language) statement: "softpkg/implementation/@id"—can be used to query the document for the "id" attribute of an "implementation" element that is a child of a "softpkg" element. The query can be represented as a tree showing the sequence of events from "softpkg" to "implementation" and finally to "id". Specifically, "id" is a child of "implementation" which is a child of "softpkg".

Referring to FIG. 2, one will see the creation of methods used to implement the filters performing the query. The filters are registered hierarchically. The forwarding filter "softpkg" 2 is registered with an SAX parser 4 and will be activated upon receiving a callback from the parser 4 indicating that a "softpkg" event has been read. The forwarding filter "implementation" 6 is registered with the forwarding filter "softpkg" 2 such that the filter "implementation" 6 can receive callbacks from the parser 4 only after the filter "softpkg" 2 has been activated. The filter "implementation" 6 will be activated upon receiving a callback indicating that an "implementation" event has been activated. The attribute filter "AttributeFilter" 8 is registered with the filter "implementation" 6 such that the filter "AttributeFilter" 8 can receive callbacks from the parser 4 only after the filter "implementation" 6 has been activated. The filters 2, 6, 8 are, in effect, SAX document handlers.

After the filters 2, 6, 8 have been created and properly registered, the document to be queried, in this example, "package.csd" is parsed. After parsing the document, the "getlength" method is performed to see if the "AttributeFilter" 8 has obtained one or more results in response to the query, and if so, the "getResult" method is performed to obtain one or more results from the "AttributeFilter" 8.

Because the filters 2, 6, 8 receive callbacks from the parser 4 in response to the events as they are being read by the parser 4, and because the filters 2, 6, 8 are hierarchically registered, the filters 2, 6, 8 enable a query to be performed on the document without having to produce a tree representing the document. In effect, a query tree is continually applied to the elements of the document as the document is being parsed. The filters 2, 6, 8 act to "filter out" the event or events that are of interest in response to the query, if in fact, at least one such event exists in the document. It can be seen that the condition expression only has to be "parsed" once for queries to any number of different XML Markup documents.

Figure 3:
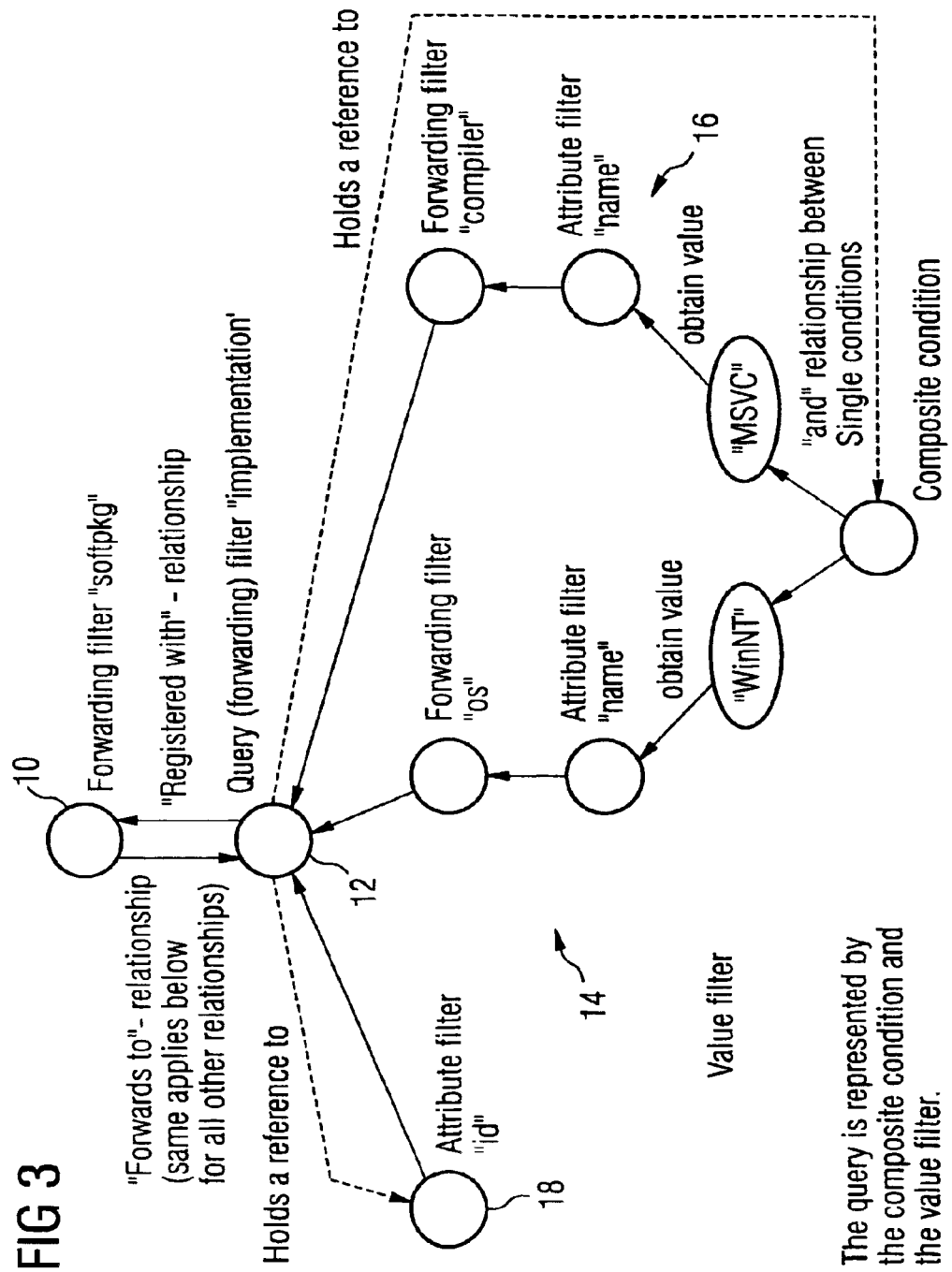
FIG. 3 is a diagram showing the hierarchy of the filters used to perform the complex XQL query-"softpkg/implementation @id.

An example of a complex query will now be discussed. Referring to FIG. 3, one will see the hierarchy of filters that can be used to perform the complex XQL query-"softpkg/implementation @id" on the XML document. The forwarding filter "softpkg" 10 is registered with the SAX-parser and will become active only when a "softpkg" element is found. The forwarding filter "implementation" 12 is registered with the filter "softpkg" 10 and can become active only when the filter "softpkg" 10 is active and when an "implementation" element is found. A first hierarchical filter chain 14 is registered with the filter "implementation" to find "os" elements having name attributes of 'WinNT' where these "os" elements are also children of "implementation" elements. A second hierarchical filter chain 16 is registered with the filter "implementation" 12 to find "compiler" elements having name attributes of 'MSVC' where these "compiler" elements are also children of "implementation" elements. The leftmost filter shown in FIG. 3 is an attribute filter that is used as a value filter 18 to temporarily store "id" attributes of "implementation" elements. The "name" attribute filters are checked to see if the desired elements have been found. If the "name" attribute filter in the first filter chain 14 has found an element for which it is searching, and if the "name" attribute filter in the second filter chain 16 has found an element for which it is searching, then the necessary composite condition is satisfied and the one or more "id"

attributes in the value filter 18 are obtained from the value filter 18 in response to the query.

The computer language C++, for example, could be used to construct computer executable instructions that would implement the filters, and the computer executable instructions could be stored on a computer readable medium, such a ROM (read only memory) or a RAM (random access memory). The computer executable instructions could also be stored on a portable computer disk for downloading into a computer device at a later time, wherein the computer device, upon executing the instructions, would perform the method described hereinabove.

The invention has been described in detail with particular reference to preferred embodiments thereof and examples, but it will be understood that variations and modifications can be effected within the spirit and scope of the invention.

What is claimed is:

1. A device to perform a query on a Markup document, comprising a receiver to receive a query;
   a design unit to design a plurality of filters to reflect a structural linkage of a condition tree representing the query, the design unit comprising:
      a highest level designer to design a highest-level filter that can become active only if an event-based parser indicates that an element for which the highest-level filter is searching has been found, and
      a lowest-level designer to design a filter that can become active only when the highest-level filter has become active and when the parser indicates that an element for which the lowest-level filter is searching has been parsed;
   a parser to parse the Markup document; and
   a checker to check the lowest-level filter to determine whether it has found the element for which it has been searching.

2. A computer-readable medium storing a program for controlling a computer to perform a method of performing a query on a Markup document, which comprises:
   receiving a query;
   designing a plurality of filters to reflect a structural linkage of a condition tree representing the query, wherein designing the plurality of filters comprises:
      designing a highest-level filter that can become active only if an event-based parser indicates that an element for which the highest-level filter is searching has been found, and
      designing a lowest-level filter that can become active only when the highest-level filter has become active and when the parser indicates that an element for which the lowest-level filter is searching has been parsed;
   parsing the Markup document; and
   checking the lowest-level filter to determine whether it has found the element for which it has been searching.

3. A method of performing a query on a Markup document using a computer, which comprises:
   receiving a query;
   designing a plurality of filters to reflect a structural linkage of a condition tree representing the query, wherein designing the plurality of filters comprises:
      designing a highest-level filter that can become active only if an event-based parser indicates that an element for which the highest-level filter is searching has been found, and
      designing a lowest-level filter that can become active only when the highest-level filter has become active and when the parser indicates that an element for which the lowest-level filter is searching has been parsed;
   parsing the Markup document; and
   checking the lowest-level filter to determine whether it has found the element for which it has been searching.

4. The method according to claim 3, wherein the step of designing the plurality of filters further comprises:
   designing at least one intermediate-level filter that can become active only when the highest-level filter has become active and when the parser indicates that an element for which the intermediate-level filter is searching has been parsed; and
   designing the lowest-level filter to become active only when the intermediate-level filter has become active.

5. The method according to claim 3, further comprising:
   defining the lowest-level filter as a first lowest-level filter;
   designing a second lowest-level filter that can become active only when the highest-level filter has become active and when the parser indicates that an element for which the lowest-level filter is searching has been parsed; and checking the second lowest-level filter to determine whether it has found the element for which it has been searching.

6. The method according to claim 5, further comprising:
   designing a value filter that will become active only when the highest-level filter has become active and when the parser indicates that an element for which the value filter is searching has been parsed; and
   if the first lowest-level filter has found the element for which it has been searching and the second lowest-level filter has found the element for which it has been searching, obtaining an element from the value filter that is linked to the elements in the first lowest-level filter and in the second lowest-level filter.

7. The method according to claim 1, further comprising:
   designing a value filter that will become active only when the highest-level filter has become active and when the parser indicates that an element for which the value filter is searching has been parsed; and
   if the lowest-level filter has found the element for which it has been searching, obtaining an element from the value filter that is linked to the element in the lowest-level filter.

\* \* \* \* \*